United States Patent
Eschler et al.

(10) Patent No.: US 6,791,511 B2
(45) Date of Patent: Sep. 14, 2004

(54) DISPLAY DEVICE

(75) Inventors: Johannes Eschler, Ditzingen (DE); Reinhold Fiess, Durbach (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 09/913,981

(22) PCT Filed: Dec. 21, 2000

(86) PCT No.: PCT/DE00/04581

§ 371 (c)(1),
(2), (4) Date: Nov. 30, 2001

(87) PCT Pub. No.: WO01/46739

PCT Pub. Date: Jun. 28, 2001

(65) Prior Publication Data

US 2002/0167498 A1 Nov. 14, 2002

(30) Foreign Application Priority Data

Dec. 21, 1999 (DE) .......................................... 199 61 572

(51) Int. Cl.⁷ .......................... G09G 5/00; G02B 27/14; H04N 7/00; G02F 1/1335
(52) U.S. Cl. .............................. 345/8; 345/7; 359/630; 359/631; 348/115; 349/11
(58) Field of Search ......................... 345/7–9; 359/630, 359/631; 348/115; 349/11

(56) References Cited

U.S. PATENT DOCUMENTS

| | | | |
|---|---|---|---|
| 4,708,438 A | 11/1987 | LaRussa et al. | |
| 4,831,366 A | 5/1989 | Iino | |
| 4,919,517 A | * 4/1990 | Jost et al. | 359/630 |
| 4,978,196 A | * 12/1990 | Suzuki et al. | 359/630 |
| 5,005,010 A | * 4/1991 | Misaki et al. | 345/7 |
| 5,140,465 A | * 8/1992 | Yasui et al. | 359/631 |
| 5,327,154 A | 7/1994 | Aoki | |
| 5,414,439 A | * 5/1995 | Groves et al. | 345/7 |
| 5,614,885 A | 3/1997 | Van Lente et al. | |
| 5,734,506 A | 3/1998 | Williams | |
| 6,124,647 A | * 9/2000 | Marcus et al. | 307/10.1 |

FOREIGN PATENT DOCUMENTS

| | | |
|---|---|---|
| DE | 12 97 351 | 6/1969 |
| DE | 25 19 308 | 11/1975 |
| DE | 43 23 571 | 1/1994 |
| FR | 2 681 702 | 3/1993 |
| WO | WO 91 06031 | 5/1991 |

OTHER PUBLICATIONS

M. H. Freeman, *Head–Up Sisplays –Part* 2 , Optics Technology, vol. 1, No. 4, Aug. 1969, pp. 175–182.

* cited by examiner

Primary Examiner—Regina Liang
Assistant Examiner—Duc Q. Dinh
(74) Attorney, Agent, or Firm—Kenyon & Kenyon

(57) ABSTRACT

A display device for a motor vehicle is proposed, which is used to display a virtual image on the windshield of a motor vehicle. The image is displayed by way of an image-forming unit which is arranged in an upper area of the windshield or in a region of the vehicle roof. The generated image is guided via a first aspherical mirror and a second aspherical mirror onto the windshield.

14 Claims, 2 Drawing Sheets

DISPLAY DEVICE

FIELD OF THE INVENTION

The present invention relates to a display device.

BACKGROUND INFORMATION

From U.S. Pat. No. 5,414,439, a display device in a motor vehicle is already known in which an image, picked up by an infrared camera, can be projected by a display, arranged in the dashboard, via an aspherical mirror, likewise arranged in the dashboard, onto the windshield. A virtual image, which is visible for a driver in the vehicle, appears on the windshield. In this case, both the display and the aspherical mirror must be disposed in the dashboard. In addition, an opening must be provided in the dashboard for the light which is reflected by the aspherical mirror to the windshield and which is necessary for an image representation.

SUMMARY OF THE INVENTION

In contrast, the display device of the present invention has the advantage that a display device for a virtual image can be implemented in a space-saving manner in a vehicle; for because an image-forming unit is arranged in the region of the vehicle roof or in an upper region of the windshield, an arrangement of optical elements within the dashboard can be dispensed with to the greatest extent possible. In particular, it is not necessary to provide a light path within the dashboard. Therefore, it is possible to dispense with a corresponding opening in the region of the dashboard. Consequently, due to the reduced space requirements, costs when constructing the display device can be lowered. It is also possible to retrofit a display device of the present invention on a vehicle which is not designed for such a display device by its manufacturer and in which no place is provided for a light path in the dashboard. In addition, temperature problems can be avoided which can occur with an arrangement of an image-forming unit in the dashboard, since the dashboard can generally heat up particularly strongly due to direct exposure to sunlight.

It is particularly advantageous to arrange the second aspherical mirror on the dashboard in a manner that the mirror can be covered. Soiling or damage of the mirror can thereby be avoided.

Furthermore, it is advantageous to design the first or the second aspherical mirror to be adjustable by motor. Such an adjustment permits adaptation of the alignment of the first and/or the second aspherical mirror to a sitting position of a driver, so that the position of the virtual image can be optimally adjusted.

It is also advantageous to carry out this adjustment via an operating element, so that unnecessary touching of the mirror, and soiling possibly associated with it, can be avoided.

It is furthermore advantageous to design the image-forming unit as a liquid-crystal cell having a backlighting, since in this way, the image-forming unit can be implemented particularly inexpensively.

Another advantage is for the windshield to be wedge-shaped. It is thereby possible to avoid double images in the projection which are formed because, in a windshield made of safety glass, multiple refraction can take place at the individual glass layers of the safety glass. The wedge-shaped design makes it possible for these double images to fall on one another, and only one image is visible for an observer.

Moreover, it is advantageous to integrate the image-forming unit or the first aspherical mirror into an interior mirror module. Installation expenditure can thereby be further reduced, since only the interior mirror module is arranged on the windshield or on the vehicle roof. In this context, the image-forming unit may also be covered for a user by the interior mirror, and a possible disturbance to the user by a visible, image-forming unit is avoided.

It is further advantageous to cover the mirror with a foil, which reduces the visibility of the mirror without at the same time substantially influencing the reflection properties of the mirror. By this, a glare, e.g. by sunlight which falls on the second aspherical mirror, can be avoided to the greatest extent possible.

DETAILED DESCRIPTION

Figure 1:
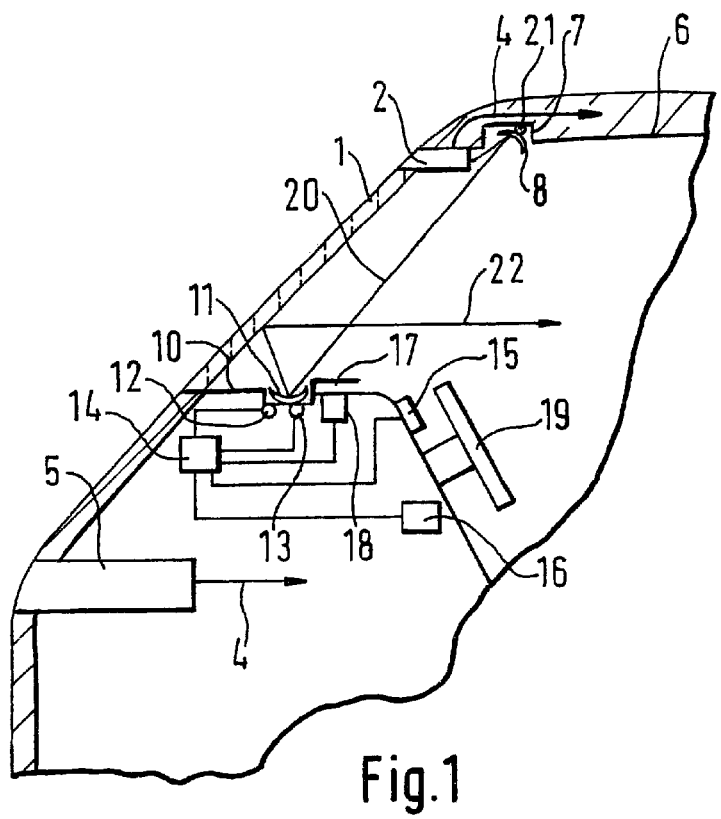
FIG. 1 shows a first exemplary embodiment of the display device according to the present invention in a motor vehicle.

FIG. 1 shows the front area of a passenger compartment of a motor vehicle in a longitudinal cross-section. An image-forming unit 2 is arranged on a windshield 1 of the vehicle. Image-forming unit 2 is positioned on the windshield near to a vehicle roof 3 and is connected to a camera 5 via a data connection 4, the entire connection not being shown in the Figure, but rather being indicated by arrows. A cover 6 is arranged on vehicle roof 3. Cover 6 has an indentation 7 in which a first aspherical mirror 8 is arranged. Below windshield 1 is the dashboard whose top side 10 adjoins windshield 1. A second aspherical mirror 11 is situated on top side 10 of the dashboard. The position of second aspherical mirror 11 can be changed by a first motor 12 and a second motor 13. Both first motor 12 and second motor 13 are controlled by a control unit 14. Control unit 14 can be influenced by a user via an operating control element 15. For example, operating control element 15 has rotary knobs and/or push buttons. Control unit 14 is also connected to an ignition lock 16. A data connection, particularly for the brightness control of the virtual image displayed on windshield 1, from control unit 14 to image-forming unit 2 is not shown in the figure. A cover flap 17 is arranged next to second aspherical mirror 11. Cover flap 17 can be folded over second aspherical mirror 11, and to this end, is movable by a third motor 18 which is also controlled by control unit 14. Second aspherical mirror 11 is situated behind a steering wheel 19 on the side of steering wheel 19 facing away from a driver of the vehicle. Ignition lock 16 and operating control element 15 are preferably arranged next to steering wheel 19. Light beams running from image-forming unit 2 are guided via first aspherical mirror 8 to second aspherical mirror 11, from there onto windshield 1, from which in turn they are guided to the eye of an observer located in front of steering wheel 19. A beam path 20 between the named elements is drawn in, the eye of the observer being indicated by an arrow 22 at beam path 20. Due to reflections on windshield 1, a virtual image is formed which an observer, preferably the driver, can perceive.

Figure 2:
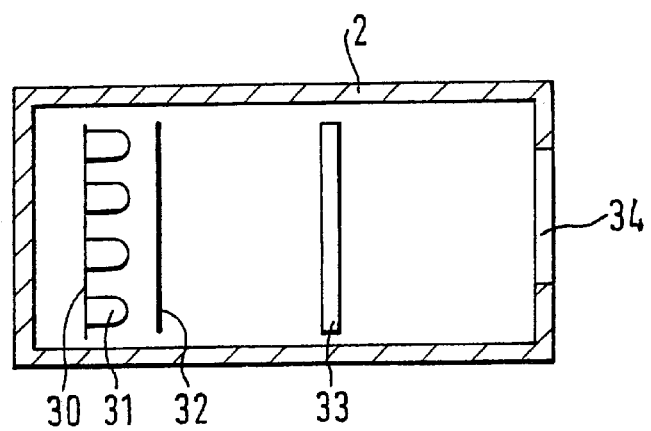
FIG. 2 shows a design of an image-forming unit having a liquid-crystal cell.

In the exemplary embodiment shown in FIG. 1, image-forming unit 2 is arranged on windshield 1 near the vehicle roof. It is also possible to integrate image-forming unit 2 into vehicle roof 3. The image is formed in image-forming unit 2, for example, using a backlit liquid-crystal cell. An exemplary embodiment for this is shown in FIG. 2. Image-forming unit 2 is provided with an opening 34, behind which a liquid-crystal cell 33 is arranged. Liquid-crystal cell 33 has segments which can be electrically controlled individually and whose optical transmission can be influenced by the electrical control. The individual segments are not shown in FIG. 2. In one preferred exemplary embodiment, liquid-crystal cell 33 has a screen diagonal of 1.3 inches. A diffuser 32 is arranged on the side of liquid-crystal cell 33 facing away from opening 34. Located on the side of diffuser 32 facing away from opening 34 is an arrangement of light-emitting diodes 31 which are preferably arranged on a printed circuit board 30. A voltage supply of light-emitting diodes 31 is not marked in in FIG. 2. For example, instead of light-emitting diodes 31, a backlighting using incandescent lamps, glow lamps or cold-cathode fluorescent lamps is possible. The light generated by light-emitting diodes 31 strikes on diffuser 32 which scatters the incident light and thus contributes to a homogenous backlighting of liquid-crystal cell 33. At this point, an image formation is possible by the control of individual segments of liquid-crystal cell 33. In so doing, various image colors are possible as a function of the color of light-emitting diodes 31; for example, when working with red light-emitting diodes, the image is composed of various shades of red, while white light-emitting diodes result in a representation in shades of gray.

The light of the image generated by liquid-crystal cell 33 emerges from opening 34, runs along beam path 20 and strikes first of all on first aspherical mirror 8, as shown in FIG. 1. First aspherical mirror 8 is concave-curved on its side facing image-forming unit 2, and has a focal distance in a range from 50 mm to 120 mm. In one preferred exemplary embodiment, first aspherical mirror 8 has a focal distance of 90 mm. First aspherical mirror 8 is, for example, concave in the form of a segment of a spherical surface, an ellipsoid of revolution or a cylindrical surface. First aspherical mirror 8 is arranged in indentation 7 of cover 6 of vehicle roof 3 using a holding device 21. First aspherical mirror 8 is adjusted during installation of the display device in the vehicle, the position of first aspherical mirror 8 in indentation 7 being so adjusted that an optimal image representation results on windshield 1. However, in an exemplary embodiment not shown in the drawing, it is also possible to provide a motor control or a manual adjusting device at first aspherical mirror 8 which permits a readjustment. The light is guided along beam path 20 to second aspherical mirror 11. Like the first aspherical mirror, second aspherical mirror 11 is likewise concave and has a focal distance between 300 mm and 800 mm. In one preferred exemplary embodiment, the focal distance is 430 mm. Second aspherical mirror 11 is adjustably mounted, so that using a first motor 12 and a second motor 13, the mirror is adjustable about two axes running perpendicular to one another in a mirror plane. An implementation possibility not shown in the Figure is, for example, to support second aspherical mirror 11 at these axes of rotation on top side 10 of the dashboard, and to connect first motor 12 to the one, and second motor 13 to the other axis. Beam path 20, which runs from the second aspherical mirror to windshield 1, is changed by an adjustment of second aspherical mirror 11. The position of the virtual image, which is visible for an observer on windshield 1, is thereby alterable. In this way, it is possible, for example, to adjust the position of the image to the seat position of a driver and to his/her body size. To this end, using operating control element 15 which is connected to control unit 14, that in turn is connected to first motor 12 and to second motor 13, the driver can activate first motor 12 and second motor 13, respectively, and in this way adjust second aspherical mirror 11. Arranged next to second aspherical mirror 11 is a cover flap 17 which, in a first state, covers second aspherical mirror 1 1, and in a second state, clears. To that end, in a first exemplary embodiment, cover flap 17 can be folded over second aspherical mirror 11 by third motor 18, which is likewise connected to control unit 14, the cover flap being supported on an axle. Furthermore, in another exemplary embodiment, it is possible to slide cover flap 17 over second aspherical mirror 11 with the aid of third motor 18.

Particularly when the vehicle is stationary, the display device is not needed. Therefore, control unit 14 is connected to ignition lock 16. If the vehicle is switched off, then third motor 18 is activated and second aspherical mirror 11 is covered by cover flap 17. When the vehicle is started again, control unit 14 detects an actuation of ignition lock 16 and the third motor is activated, so that second aspherical mirror 11 is cleared again by cover flap 17.

Camera 5 is preferably designed as an infrared camera and is used during poor visibility, for example, in fog, to pick up an image of the road course and, from that, to generate video information which is transmitted via data connection 4 to image-forming unit 2 for display on windshield 1. For that purpose, camera 5 is preferably arranged in a front area of the vehicle, for example, in the area of a radiator grille or a headlight.

Figure 3:
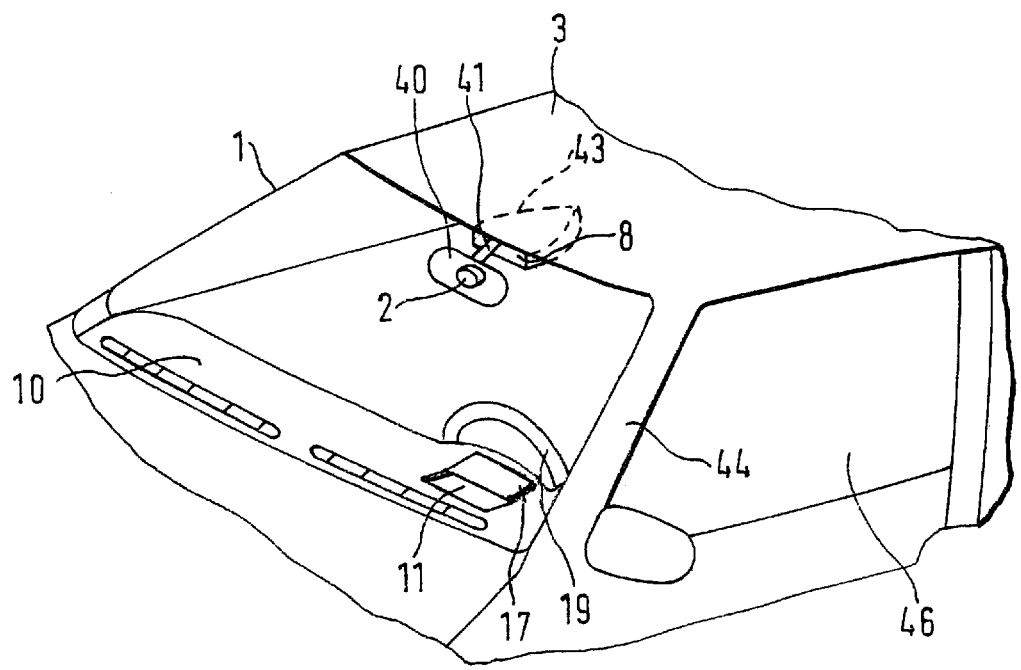
FIG. 3 shows another exemplary embodiment of a display device according to the present invention.

FIG. 3 shows another exemplary embodiment of the display device according to the present invention. Here and in the following, identical reference numerals also designate identical elements. Image-forming unit 2 is arranged on an interior mirror 40. Interior mirror 40 is in turn connected to a housing 43 via a holder 41. Interior mirror 40, holder 41 and housing 43 form an interior mirror module. An electrical connection to image-forming unit 2 runs via holder 41. Housing 43 is integrated into vehicle roof 3, preferably in a U-profile which, for reasons of body technology, is present there in a great number of vehicles, and thus offers place for housing 43 without housing 43 extending into the passenger compartment. First aspherical mirror 8 is arranged outside on housing 43. Interior mirror 40 hides image-forming unit 2 to the greatest extent possible from an observer who is located in front of steering wheel 19. For example, data connection 4 to image-forming unit 2 runs along side piece 44 which is arranged between the windshield and a side window 46. Second aspherical mirror 11 in the exemplary embodiment is rectangular. In one preferred exemplary embodiment, the horizontal extension, thus parallel to the windshield, lies at approximately 250 mm, in an extension direction perpendicular to the windshield, lies at 90 mm. First aspherical mirror 8 has an area of 100 mm by 40 mm. Cover flap 17 can be folded over second aspherical mirror 11.

Figure 4:
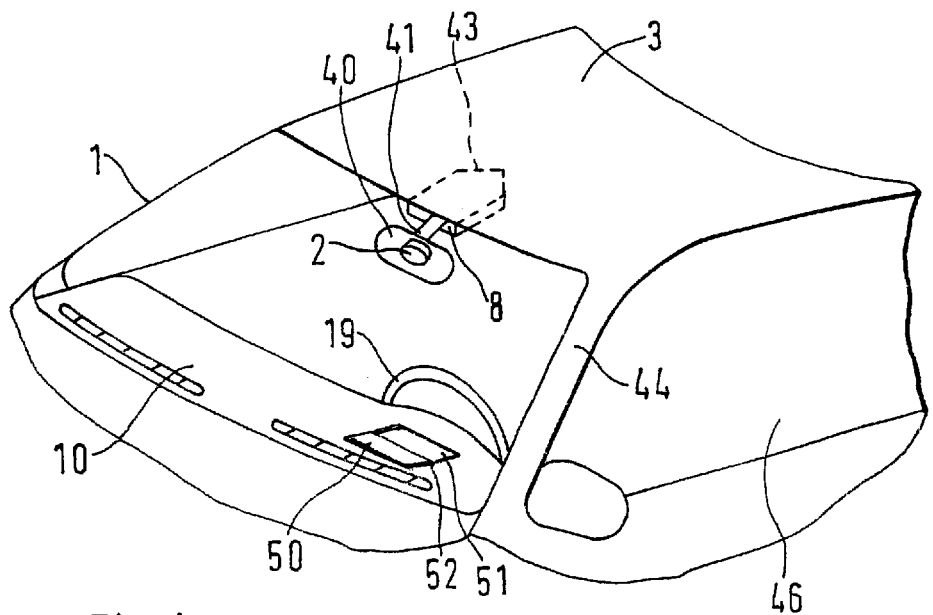
FIG. 4 shows a further exemplary embodiment of a display device of the present invention.

A further exemplary embodiment is shown in FIG. 4. In this exemplary embodiment, a second aspherical mirror 50 is drawn in. Second aspherical mirror 50 is designed so that it itself is capable of folding, an axis of rotation running along a longitudinal side 52 of second aspherical mirror 50. Disposed next to aspherical mirror 50 is a depression 51 into which second aspherical mirror 50 is able to fold. The back side of the second aspherical mirror, thus the side opposite the mirror side, is covered with a plastic that preferably is made of the same material as top side 10 of the dashboard, so that the back side of the second aspherical mirror stands out as little as possible from top side 10 of the dashboard. In this exemplary embodiment, an adjustment of second aspherical mirror 50 with respect to the position of the virtual image on windshield I can take place about the axis running along longitudinal side 52. In addition, this axle itself can be designed to be inclinable in a direction perpendicular to its axial direction.

A possible glare for a driver can be avoided by an additional cover, preferably by a cover foil arranged on second aspherical mirror 11 and 50, respectively. For that purpose, it is possible, for example, to arrange a polarizer foil on second aspherical mirror 11 or 50. Particularly when using a liquid-crystal cell or a coherent light source, e.g. a laser, in image-forming unit 2, the light striking second aspherical mirror 11 or 50 via first aspherical mirror 8 is polarized. If a polarizer, which is arranged in such a way that it exhibits an absorption minimum for the light of image-forming unit 2, is now disposed on second aspherical mirror 11, 50, then only a minimum brightness loss occurs in the reflection, preferably an anti-reflection coating additionally being applied on the polarizer. Thus at least half of environmental light, which generally exhibits a uniform distribution over all polarization directions, is absorbed, and a possible glare effect is reduced without the brightness of the virtual image projected onto windshield I being substantially impaired thereby. Furthermore, it is also possible to arrange shutter foils on second aspherical mirror 11, thus foils which allow a light to come in or exit only at a preferred angle of incidence or angle of reflection, this effect being achieved, for example, by a mask pattern integrated into the foil. A light leak from second aspherical mirror 11, 50 to an observer located in front of steering wheel 19 is thereby sharply reduced, as well.

Operating control element 15 is further used to adjust the image brightness. This is effected, for example, by increasing or decreasing an operating voltage for light-emitting diodes 31 located in image-forming unit 2, to thus increase or decrease the brightness of light-emitting diodes 31. In addition to the indicated design of image-forming unit 2 as a liquid-crystal cell 33 having a backlighting, it is also possible to design image-forming unit 2 as a laser display, a micro-mirror display, a vacuum fluorescent display or a plasma display. While the vacuum fluorescent display and the plasma display are luminous displays themselves, for which a backlighting is unnecessary, in the case of the two other specific embodiments, the laser display and the micro-mirror display, a preferably coherent light source, e.g. a laser unit, can be arranged in image-forming unit 2. The image is now formed either by an activation of the laser unit or by an activation of the micro-mirrors.

Windshield 1 is preferably wedge-shaped in that it is thicker in an upper region allocated to vehicle roof 3, and tapers in the direction of top side 10 of the dashboard. The tapering is achieved in that two glass panes which form the safety glass of the windshield are inserted so that they are not quite parallel, but rather have a greater clearance in an upper region of the windshield. Given a reflection of the light issuing from second aspherical mirror 11, 50 onto windshield 1, a reflection occurs at the two glass panes of windshield 1. Because of the wedge-shaped design, the virtual images resulting due to the reflection coincide for an observer. A windshield vapor deposition which, for example, prevents the reflection on a pane, is now no longer necessary.

What is claimed is:

1. A display device in a motor vehicle, comprising:
   an image-forming unit arranged in one of an area of a vehicle roof and in an upper region of a windshield of the motor vehicle;
   a first aspherical mirror arranged in the area of the vehicle roof; and
   a second aspherical mirror arranged in a region of a dashboard of the motor vehicle, wherein:
   light emitted by the image-forming unit is transmittable to the first aspherical mirror,
   light from the first aspherical mirror is projectable onto the second aspherical mirror,
   light from the second aspherical mirror is projectable onto the windshield, and
   a virtual image is able to be formed on the windshield.

2. The display device according to claim 1, wherein:
   the second aspherical mirror is arranged on the dashboard in a manner that the second aspherical mirror can be covered.

3. The display device according to claim 2, wherein:
   the second aspherical mirror is arranged on a top side of the dashboard.

4. The display device according to claim 1, further comprising:
   at least one motor for performing a motor-adjustment on at least one of the first aspherical mirror and the second aspherical mirror.

5. The display device according to claim 1, further comprising:
   an operating control element arranged in the motor vehicle and for adjusting at least one of the first aspherical mirror, the second aspherical mirror, and an image brightness of the virtual image formed onto the windshield.

6. The display device according to claim 1, wherein:
   the first aspherical mirror has a focal distance in a range from 50 mm to 120 mm, and
   the second aspherical mirror has a focal distance in a range from 300 mm to 800 mm.

7. The display device according to claim 1, wherein:
   the image-forming unit includes one of a backlit liquid-crystal cell, a laser display, a micro-mirror display, a vacuum fluorescent display, and a plasma display.

8. The display device according to claim 1, wherein:
   the windshield is wedge-shaped.

9. The display device according to claim 1, wherein:
   the image-forming unit is arranged on an interior mirror module.

10. The display device according to claim 1, wherein:
    the first aspherical mirror is arranged on an interior mirror module.

11. The display device according to claim 1, wherein:
    the first aspherical mirror is arranged on a housing at the vehicle roof.

12. The display device according to claim 1, further comprising:
    a camera arranged on the motor vehicle, wherein:
    an image picked up by the camera is able to be projected as the virtual image on the windshield.

13. The display device according to claim 12, wherein:
    the camera includes an infrared camera.

14. The display device according to claim 1, further comprising:
    a foil for covering the second aspherical mirror and for reducing a visibility of second aspherical mirror.

* * * * *